United States Patent [19]

Coe

[11] 3,787,709

[45] Jan. 22, 1974

[54] GROUND FAULT-SENSITIVE DETECTOR AND CIRCUIT BREAKER DEVICE

[75] Inventor: Ronald J. Coe, Huntsville, Ala.

[73] Assignee: SCI Systems, Inc., Huntsville, Ala.

[22] Filed: Dec. 13, 1971

[21] Appl. No.: 207,288

[52] U.S. Cl. .......... 317/18 D, 317/27 R, 317/33 SC
[51] Int. Cl. ............................................. H02h 3/26
[58] Field of Search ............ 317/18 D, 27 R, 33 SC

[56] References Cited
UNITED STATES PATENTS

| | | | |
|---|---|---|---|
| 3,558,980 | 1/1971 | Florance | 317/18 D |
| 3,633,070 | 1/1972 | Vassos | 317/18 D |
| 3,555,360 | 1/1971 | Lee | 317/18 D |
| 3,657,604 | 4/1972 | Willard | 317/18 D |
| 3,641,393 | 2/1972 | Florance | 317/18 D |

Primary Examiner—James D. Trammell
Attorney, Agent, or Firm—Curtis, Morris & Safford, P. C.; Gregor N. Neff, Esq.

[57] ABSTRACT

The device detects "ground faults" (short circuits to ground) in electrical wiring systems such as those used in household or factory wiring. The device causes disconnection of power if the fault current exceeds a relatively low value such as 5 milliamperes so as to minimize shock damage to the human being or other object causing the short circuit. Means are provided for detecting the grounding of the "hot" wire and/or the neutral wire at a point between the device and the load. A transformer with oppositely-wound primary windings, each connected in one of the lines, is connected in a bridge circuit in which the transformer normally is unbalanced. A ground fault adds the fourth leg to the bridge, balances the bridge, and a detector circuit causes the circuit breaker to open the line. The device also includes means for making it relatively insensitive to quadrature leakage currents; i.e., leakage currents which either lead or lag the alternating line current by 90°. This reduces the likelihood of "false tripping" of the device. A current transformer with its secondary winding in the neutral line and an independent source for energizing the primary winding helps make the device quite small in size and relatively inexpensive to manufacture.

10 Claims, 7 Drawing Figures

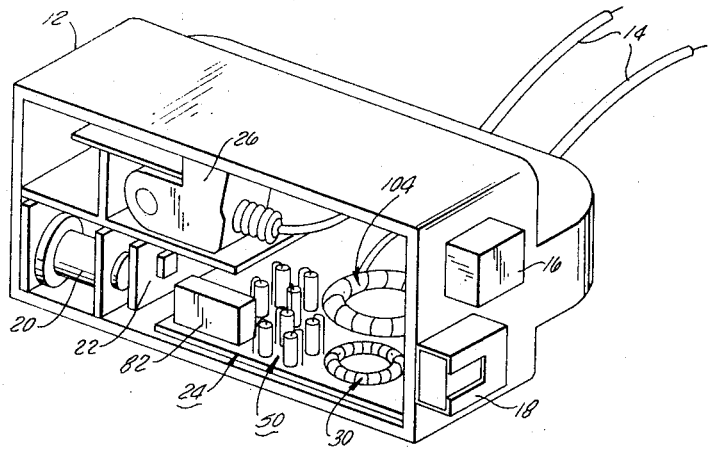
FIG. 1
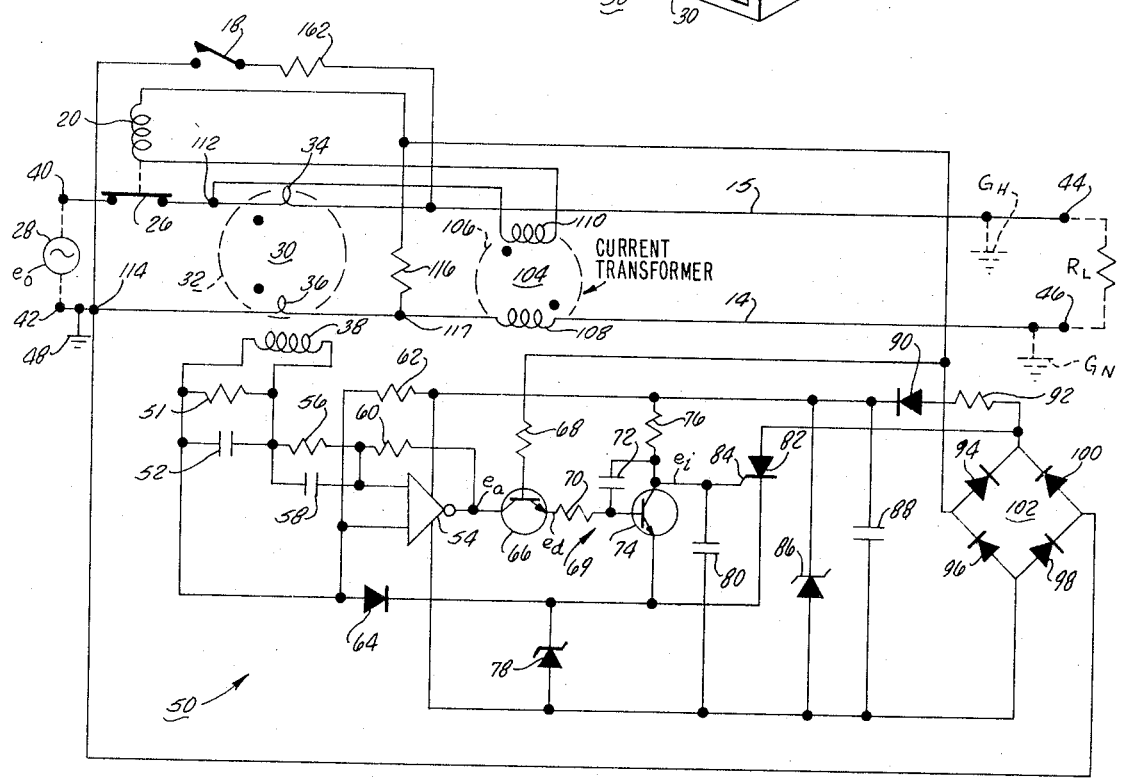
FIG. 2
FIG. 3
FIG. 4

GROUND FAULT-SENSITIVE DETECTOR AND CIRCUIT BREAKER DEVICE

This invention relates to devices for indicating ground faults in electrical conductors, and particular in electrical building wiring. Specifically, this invention relates to ground fault-sensitive circuit breakers for protecting against the electric shock of electric power users.

In the prior art, many suggestions have been made for devices to protect humans from electrical shock in their homes and businesses. In order to meet standardized safety requirements such as those promulgated by Underwriters' Laboratories in the United States, many such prior devices have been forced to include rather large and expensive transformers and other electrical circuit components. Thus, it is an object of the present invention to provide a ground fault indicator and circuit breaker device which meets the stringent standardized safety requirements, and yet is quite compact and relatively inexpensive to manufacture. It is another object of the invention to provide such a device which can be used either in the circuit breaker box in the usual business or household wiring system, or in the individual outlets or receptacles.

False "tripping" or actuation is another problem in proposed prior devices. One source of this problem is that "quadrature" currents (those leading or lagging the alternating line current by 90°) often are present due to the length and/or configuration of the wiring, and these currents can cause false tripping or an unwanted hypersensitivity to minor ground fault currents. Thus, it is another object of the invention to provide a ground fault indicator and circuit breaker device which is relatively insensitive to quadrature currents.

In accordance with the present invention, the foregoing objects are met by the provision of a ground fault indicator and circuit breaker device in which the difference between the outgoing and ingoing currents in the system is detected by means of a normally unbalanced transformer and detection circuitry for detecting when the unbalance has been reduced to a pre-determined minimum value. The deliberate imbalance is created by simply connecting a resistor with the primary windings of the transformer. A bridge circuit is formed including the transformer primary windings and the resistor in separate legs or branches, with a ground fault impedance in the final leg of the bridge. When the unbalanced current is reduced to a pre-determined level, preferably to zero, then the presence of the ground fault is indicated and circuit breaker contacts are opened to break the power distribution line. Quadrature components of unbalanced current are eliminated from the unbalanced current by the simple means of detecting only alternate half cycles of unbalanced current in a manner such that quadrature current components cancel themselves over the time duration of each such half-cycle. A current transformer with its secondary winding connected in series with the grounded "neutral" wire is used to detect grounding of the neutral wire on the load side of the detector device. The primary winding of the current transformer is not connected in series with either of the power lines, but instead is connected in series with the relatively high impedance between the power lines adjacent the power source formed by the electronic components of the device itself. The use of a primary current which already is available, especially a current which is significantly larger than the secondary current required, allows the current transformer to be made inefficient deliberately. It can, therefore, be relatively small and inexpensive.

The foregoing and other objects and advantages of the invention will be set forth in or apparent from the following description and drawings.

In the drawings:

FIG. 1 is a perspective view of a circuit breaker incorporating the present invention;

FIG. 2 is a schematic circuit diagram of the invention;

FIG. 3 is a simplified schematic diagram of a portion of the circuit shown in FIG. 2;

FIG. 4 is an equivalent circuit diagram illustrating certain prior art problems solved by the present invention;

GENERAL DESCRIPTION

Figure 5:
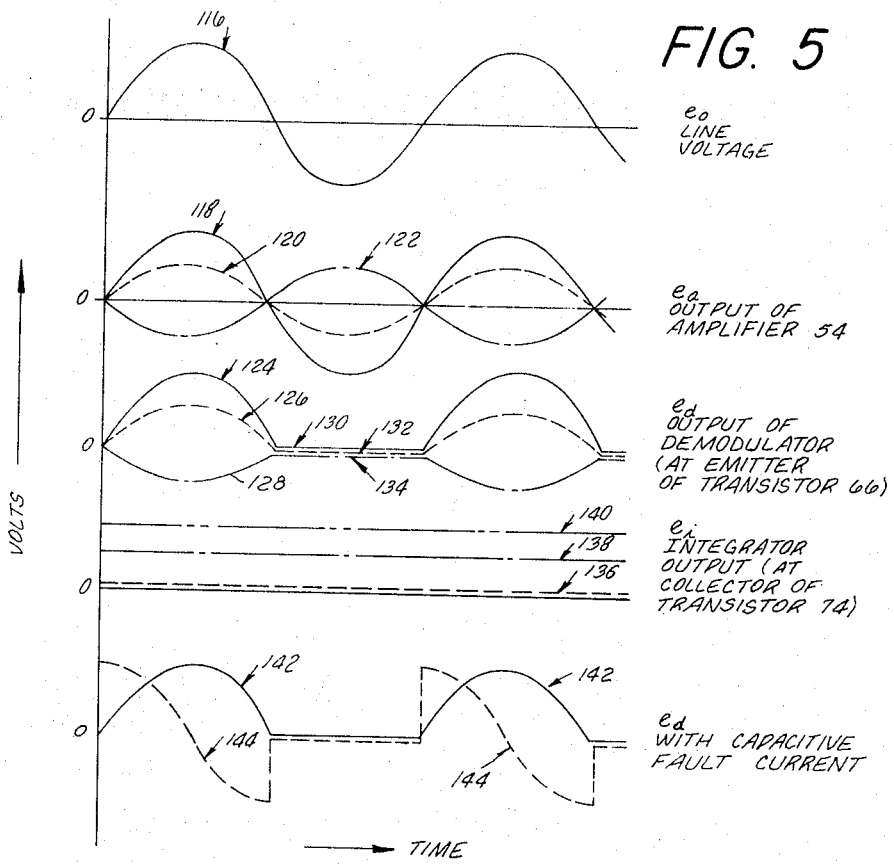
FIG. 5 is a waveform diagram illustrating the wave forms of various electrical signals in the circuit of FIG. 2.

FIG. 1 of the drawings is a perspective view of a circuit breaker 10 incorporating the invention, with the front cover of the circuit breaker removed to show the internal components. The circuit breaker 10 includes a conventional plastic housing 12. Extending from the rear of the housing are neutral lead-in and lead-out wires 14 for the neutral wire of the system. Other terminals (not shown) are provided in the rear for leading the "hot" or energized wire of the wiring system into and out of the device 10. A conventional reset button 16 and a "test" button 18 are provided on the outside of the housing 12.

Inside the housing is a conventional solenoid 20 operating a circuit breaker contact mechanism 26 by way of a linkage 22. All of the equipment described so far is conventional and forms part of the 15 or 20-ampere single-pole thermal/magnetic circuit breaker manufactured and sold by ITE Imperial Corporation, Bulldog Division. The solenoid 20 of the conventional circuit breaker ordinarily is energized in response to current overloads, and the operation of the solenoid opens the breaker contacts to disconnect the load from the power source. The breaker contacts are of the mechanically latching variety, and will remain closed until opened by the solenoid or will remain open until reset by depression of the reset button 16.

The present invention provides the circuit breaker with the additional ability to open its contacts when a ground fault occurs and the fault current reaches 5 milliamperes. The structure added for this purpose is on a small printed circuit board 24 which fits neatly within the housing 12.

FIG. 2 is a schematic circuit diagram of the ground fault indicating circuitry 50 which is mounted on the circuit board 24. FIG. 2 shows the "neutral" wire 14, and the "hot" wire 15 in a standard two-wire power distribution system for homes and other buildings. The input terminals 40 and 42 of the system are connected to AC power lines which eventually are connected to an AC power source 28. Output terminals 44 and 46, which may be, for example, household receptacle terminals, can be connected to a load represented by a load resistance $R_L$.

There are two different types of ground fault and three different ground fault conditions which the equipment of the present invention is able to detect. One such ground fault is represented by the dashed ground symbol $G_H$, which represents a fault between the hot wire 15 and ground. The second ground fault is indicated by the dashed symbol $G_N$, which indicates a fault between the neutral wire 14 and ground. It is desired that the device of the present invention detect and open the circuit breaker contacts in response to either of the conditions in which ground fault $G_H$ or $G_N$ exists alone, when the ground fault current reaches or exceeds 5 milliamperes. It also is desired to detect and open the circuit breaker contacts when a third condition exists, namely, one in which both ground faults $G_H$ and $G_N$ are present simultaneously and the ground fault current reaches or exceeds 5 milliamperes.

The circuitry for detecting a ground fault $G_H$ in the hot wire will be described first.

The circuit includes a transformer 30 with a toroidal core 32 and two for opposite would primary windings 34 and 36, each with a single turn. The winding 34 is connected in series with the hot line 15, and the winding 36 is connected in series with the neutral line 14. A secondary winding 38 of 500 turns is wound on the core 32 and produces an output voltage which is proportional to the flux imbalance between the two primary windings 34 and 36. A resistor 116 is connected between a point 117 on the neutral line between the primary winding 36 and the load and a point 112 on the hot line 15 between the primary winding 34 and input terminal 40. This connection is made through the low-impedance breaker solenoid 20, and a similarly low-impedance primary winding 110 on another transformer 104 (to be described below).

FIG. 3 shows an equivalent circuit which is formed by the combination of the primary windings 34 and 36 with the resistor 116 connected as described above. The resistor $R_f$ represents the resistance of a ground fault $G_H$. It can be seen that the four circuit elements 34, 36, 116 and $R_f$ form a bridge circuit.

When there is no ground fault $G_H$, $R_f$ is substantially infinitely large, and the bridge circuit shown in FIG. 3 is unbalanced. Thus, the resistor 116 normally causes the transformer 30 to be unbalanced so that output voltage is developed on the secondary winding 38 of the transformer. When a dangerous ground fault $G_H$ occurs, the value of $R_f$ drops from an infinite value to a relatively low value. At the point during the change at which the value of $R_f$ allows 5 milliamperes to flow, that is, $R_f$ becomes equal to resistor 116, the bridge circuit becomes balanced and the output voltage on the secondary winding 38 of the transformer drops to zero.

The detection and indicating circuitry connected to the secondary winding 38 is constructed so that it will energize the relay solenoid 20 if and only if the amount of imbalance of the transformer 30 is reduced to a predetermined level. Specifically, when the imbalance is reduced to a zero level so that the transformer 30 is balanced, or is driven to an unbalanced condition in the opposite direction, the circuit operates to detect this condition and to energize the solenoid 20 and to open the circuit breaker contacts 26. The amount of initial imbalance is set at a value equivalent to approximately 5 milliampers current so that the circuit breaker opens to prevent damage when a ground falut current of 5 milliamperes is detected.

A current transformer 104 is provided in addition to the transformer 30 for detecting ground fault conditions in which either the neutral ground fault $G_N$ occurs alone, or the hot line ground fault $G_H$ and the neutral ground fault $G_N$ occur simultaneously.

The current transformer 104 has a toroidal core 106 on which is wound a primary winding 110. A secondary winding 108 is connected in series with the neutral line 14 at a location between the primary winding 36 of transformer 30 and the load $R_L$. The primary winding 110 is advantageously energized by connecting one end to the hot line 15 at point 112, and the other end to a full-wave rectifier circuit 102 which supplies the primary winding 110 and the solenoid 20 with a relatively constant low-level current of approximately 10 milliamperes under normal no-fault conditions.

Under normal conditions with no ground fault, the transformer 104 acts merely as a source which sends current through both the ingoing and outgoing lines 14 and 15 in equal amounts so that it creates no re-balancing of the transformer 30. However, when a neutral ground fault $G_N$ occurs, a short-circuit is completed from the ground 48 adjacent terminal 42 to the ground $G_N$ near terminal 46. This normally would short-circuit the primary winding 36 on gransformer 30, and might make that transformer insensitive to the ground fault. However, the winding 108 is wound in such a sense that it produces a current in the transformer primary winding 36 which tends to re-balance the transformer 30 towards zero. This causes the solenoid 20 to operate and the circuit breaker contacts 26 to open, thus avoiding damage to the object or person causing the fault.

DETECTION AND INDICATING CIRCUIT

In the detection circuitry 50 which is used to detect the re-balancing of transformer 30, the unbalance voltage on the secondary winding 38 is conducted to the input leads of a high-gain integrated circuit differential operational amplifier 54. The amplified output is conducted to a synchronous gating transistor 66 which delivers the output signal of the differential amplifier to a Miller integrator circuit 69. The output of amplifier 54 is conducted by transistor 66 only during alternate half cycles of line voltage supplied by the power source 28. The reason for this is that the base lead of transistor 66 is connected through a resistor 68 to the hot line 15 at point 112. As will be explained in greater detail below, this effectively eliminates quadrature components from the signals utilized by the detection circuit.

The integrator circuit 69 includes a resistor 70, a capacitor 72 and a transistor 74 connected as shown, and averages the signals it receives. The integrator circuit 69 applies its DC output to the gate lead 84 of an SCR (Silicon controlled rectifier) 82. The anode-cathode path of SCR 82 is connected through a Zener diode 78 to the top and bottom leads of the rectifier circuit 102 so that the SCR provides a low impedance shunt around the rectifier circuit 102 when the SCR is turned on. Thus, the result of turning SCR 82 on is that the solenoid 20 is energized with a much larger current than the 10 milliamperes normally flowing through it, and the solenoid opens the contacts 26 of the circuit breaker.

The full-wave rectifier 102 is used both to supply AC to the SCR 82 and the primary winding 110 of transformer 104, and also to provide DC to supply the Miller integrator circuit and the differential amplifier 54. Smooth DC is supplied through a resistor 92 and a diode 90 across a filter capacitor 88. A Zener diode 86 regulates the DC voltage thus supplied.

A spike filter capacitor 80 is connected between the SCR gate 84 and the bottom terminal of the rectifier bridge 102 in order to filter out any voltage spikes in the integrator output and eliminate such spikes as cuases of false "tripping," i.e., actuation of the breaker when there is no ground fault.

A Zener diode 78 is connected between the emitter lead of transistor 74 and the bottom terminal of the fullwave rectifier circuit in order to provide a bias voltage. Direct current is supplied through a resistor 62 to a diode 64 which is provided for temperature-compensation purposes.

One of the input leads of the differential amplifier 54 is connected directly to one of the terminals of secondary winding 38, and the other input lead is connected through a blocking capacitor 58 to the other terminal of the secondary winding 38. The resistor 56 provides a discharge path for the blocking capacitor 58.

A parallel resistor 51 serves as a load for the secondary winding 38. The resistor 51 and a parallel capacitor 52 are connected across the secondary winding 38 and serve together as a spike filter.

A resistor 60 is connected between the input and output of the amplifier 54 to control its gain in a known manner.

Resistor 92 is an attenuating resistor. The diode 90 is provided in order to ensure that charge does not drain from filter capacitor 88 so quickly upon the conduction of SCR 82 that DC bias is removed from amplifier 54 before the SCR is latched into a conducting state.

The detection and indicating circuit operates as follows: the amplifier 54 detects the normally-occuring unbalance voltage developed on the secondary winding 38 of transformer 30. This voltage is amplified by the amplifier 54 and delivered during alternate half-cycles of line voltage to the integrator circuit 69. The signals thus permitted to flow to the integrator circuit are integrated and the integrated DC signal is applied to the gate lead 84.

As long as there is a net positive output from the amplifier 54, the integrator circuit produces a DC signal which keeps transistor 74 in a conducting state. When in a conducting state, transistor 74 connects the gate electrode 84 of SCR 82 to its cathode electrode and thus keeps it turned off.

When the output from amplifier 54 reaches zero or reverse polarity slightly, the DC applied to transistor 74 will change polarity, thus turning that transistor off. This disconnects the gate lead 84 from its cathode lead, thus permitting the voltage across resistor 76 to be applied to the gate lead 84 to turn the SCR 82 on. The turning on of the SCR allows direct current to flow in a relatively large quantity through the solenoid 20, as described above.

In accordance with another feature of the present invention, the point of zero output from amplifier 54 is maintained relatively stable despite temperature changes, without the use of thermistors. The transistor 66, the amplifier 54, the diode 64, and the base-emitter diode of transistor 74 are connected in a bridge circuit configuration. The temperature drift in amplifier 54 is essentially negligible. This also is true of transistor 66 because of the fact that its emitter-base diode and collector-base diode are connected in series with one another. Since the temperature dirft of each diode is substantially equal and opposite to the drift of the other diode, there is substantially no net drift for the transistor 66.

The base-emitter diode of transistor 74 does have a temperature drift, but this is compensated for by diode 64 which is in the adjacent leg of the bridge circuit. The drift of diode 64 deliberately is made to follow that of the emitter-base diode of transistor 74. Thus, the overall drift of the output of the detector circuitry is made very small so that the zero output condition remains stable over a relatively wide range of temperature variations.

The connection of the active electronic components to the power supply line through the trip solenoid 20 provides valuable spike voltage filtering. The inductance L of the trip coil 20 and the resistive impedance of the circuit connected to it form together an RL filter which protects the electronic components against high-frequency voltage spikes in the supply line.

The test switch 18 is connected to the hot line 15 at a location between the load and the primary winding 34, and to the neutral line 14 at a point between the source 28 and the winding 36 through a current-limiting resistor 162. Thus, by occasional operation of the switch 18, a ground fault will be simulated and the proper operation of the device under simulated ground fault conditions thus can be checked.

The advantages provided by the invention are many. Among these advantages are the small size and relatively low cost of the circuit.

The transformer 30 can be small because only single-turn primary windings are used. This minimizes impedance added to the lines 14 and 15, and minimizes the size of the primary windings, which must be of relatively heavy gauge wire. More importantly, the number of turns of the secondary winding is kept relatively low by the use of electronic amplification rather than the large step-up turns ratios used in some prior circuits. Moreover, the use of the resistor 116 and a bridge circuit to bias the transformer 30 simplifies and reduces the cost of the device as compared to prior art proposals in which a separate bias winding is used for a similar purpose.

The current transformer 104 can be considerably smaller and less expensive than current transformers suggested in the prior art. FIG. 4 is an equivalent circuit diagram of a typical prior art device in which the primary winding of a current transformer is connected in the hot wire and the secondary winding is connected in the neutral wire of the power line. In the FIG. 4 circuit $L_P$ is the inductance of the primary winding, $L_S$ is the secondary winding inductance, and $L_M$ is the mutual inductance. It can be seen from FIG. 4 that, in order to prevent the primary and secondary windings of the current transformer of the prior art device from draining off an excessive portion of the 5 milliamperes fault current, the inductive impedance of each winding must be relatively large. Another problem is that, since both the primary and secondary windings are in series with the power lines, the wire on the windings must be of heavy enough gauge to prevent the windings from overheating or melting when passing rated currents, ine., currents of the order of 15 or 20 amperes, with short-circuit overloads up to 5,000 amps for short durations. Another problem presented by the prior art approach under discussion is that the current transformer should have high efficiency. If no more than 5 milliamperes is available in the primary winding, as well might be the case, then, in the secondary winding, the current transformer must have an efficiency near 100 percent. All of the foregoing factors tend to make the current transformer relatively large.

Other prior art proposals for solving the neutral ground problem include the use of a step-down voltage transformer with a primary winding connected across the power lines and a secondary connected in the neutral line. This approach requires a transformer with a large number of primary turns; a transformer which also is large.

In contrast, in applicant's invention, becuase of the unique circuit for energization of the primary winding 110 of the current transformer 104, a relatively small, inefficient and, therefore, relatively inexpensive current transformer can be used. One feature permitting this reduction in size is the fact that the primary winding 110 is not connected in the wires 14 or 15, and need not be of large diameter in order to carry related load currents. Instead, the winding is connected to the high impedance of the detection circuit and need withstand only a few tens of milliamperes of current. Therefore, the windings can be of small gauge wire. The transformer can be relatively inexpensive becasue it normally receives 10 milliamperes of current which normally flows in the solenoid 20 anyway. Since only 5 milliamperes is needed from the secondary winding, the transformer need be only 50 percent efficient to perform its function.

A typical housing 12 such as that shown in FIG. 1 is approximately three inches long, 1 and ½ inches high and 2 and ½ inches deep. Thus, FIG. 1 illustrates one of the major advantages of the invention.

As it has been mentioned above, one of the advantages of the invention is the elimination of quadrature signals from the signals being detected. This is accomplished by means of the gating transistor 66 which is turned on only during alternate half cycles of line voltage. FIG. 5 illustrates this operation.

In FIG. 5, the waveform 116 represents $e_o$, the line voltage at input terminals 40 and 42. Waveform 118 represents $e_a$, the output of amplifier 54.

Dashed line waveform 120 shows the reduction of the magnitude of the output signal of amplifier 54 caused by a fault current of moderate magnitude, but of a magnitude insufficient to reduce the amplifier output to zero. Waveform 122 results from a fault current which is larger than that necessary to operate the circuit breaker contacts 26. The waveform 122 is 180° out of phase with the line voltage. Waveforms 124, 126 and 128 represent $e_d$, the output of the demodulator as measured at the emitter of the transistor 66. It can be seen that the transistor 66 conducts only during the first and third half-cycles of line voltage and is turned off during the second half-cycle. i.e., during the periods represented by numerals 130, 132 and 134. This pattern is repeated, as it is explained above, so that transistor 66 conducts only during alternate half-cycles. Waveform 126 shows $e_d$ when there is a moderate fault current corresponding to curve 120. A third curve 128 represents $e_d$ under the conditions depicted by curve 122.

Curve 136 represents the normal DC output of the integrator circuit 69, as measured at the collector of transistor 74. The output of the integrator is, of course, the time integral of the various waves shown in the $e_d$ waveform diagram. Curve 136 is the integral of curve 124. Because the Miller integrator circuit 69 is an inverting circuit, curve 136 seeks a negative value but is limited at zero by the saturation of transistor 74. Waveforms 138 and 140 represent $e_i$ under the conditions depicted by $e_a$ curves 120 and 122, respectively, and show increasingly positive voltages.

Waveform sections 142 represent $e_d$ during the time periods when the gating transistor 66 is turned on. The curved portions of 142 correspond to the curved portions 124. Also shown is a capacitive current 144 to ground. This current may be caused by the capacitance to ground of the long lead wires from the source to the load. The capacitive current waveform 144 leads the waveform 142 by 90°. Because the gating transistor is turned on only during alternate half cycles, the integrator circuit integrates the capacitive current portions to a net zero value so that the capacitor currents have substantially no effect on the opening of the circuit breaker contacts 26. Thus, the device is relatively insensitive to capacitive currents and is substantially free from this potential source of false tripping. It readily can be seen that any inductive currents, which lag the line voltage by 90° similarly are cancelled by the circuit of the present invention, so that this further source of false tripping is eliminated.

ALTERNATIVE EMBODIMENT

Figure 7:
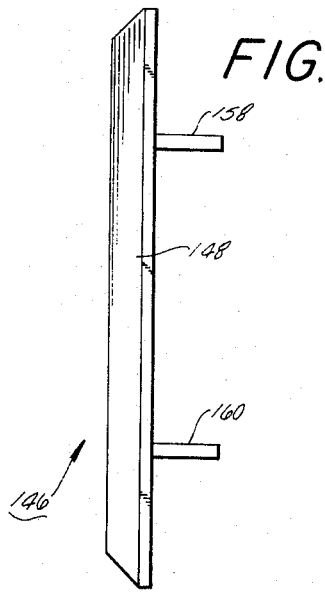
FIG. 7 is a side elevation view of the device shown in FIG. 6.
Figure 6:
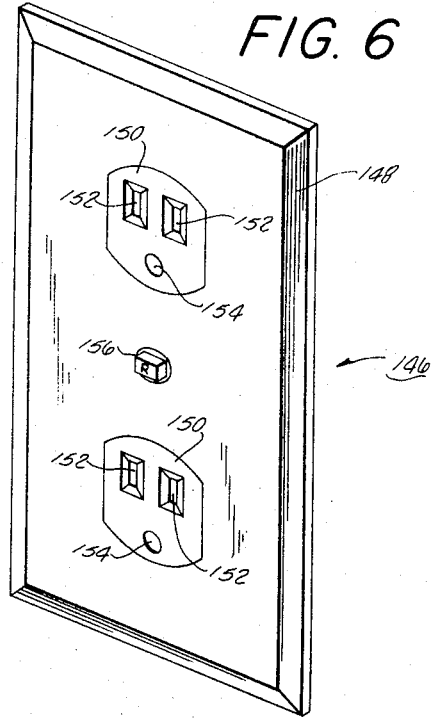
FIG. 6 is a perspective view of another embodiment of the invention.

FIGS. 6 and 7, taken together with FIGS. 2 and 3, illustrate another emobdiment of the present invention. The circuit breaker 10 shown in FIG. 1 is intended primarily for use in a conventional central circuit-breaker panel in a home, factory or other building. The device 146 shown in FIGS. 6 and 7 is intended primarily for use as a safety device for individual power outlets. It can be used by those not skilled enough to electrically install the circuit breaker shown in FIG. 1.

The device 146 includes a housing 148 and two pairs of male plug terminal members 158 and 160 for insertion into the conventional household outlet. On the front of the housing 148 are two receptacles 150 each of which has a pair of male plug-receiving holes 152 and a ground terminal receiving hole 154. A reset button 156 extends outwardly from the front of the housing 148.

Inside the housing 148 is a circuit substantially the same as that shown in FIGS. 1 and 2. However, the circuit breaker solenoid 20 and the contacts 26 are dimensioned so as to fit within the generally flat housing 148, and the breaker contacts are positioned so as to be reset by depression of the reset button 156. In effect, in using the embodiment shown in FIGS. 6 and 7, the terminals 40 and 42 of FIG. 2 are plugged into the wall receptacle. Preferably, the test switch 18 is omitted so as to prevent meddling with the device.

Both protective devices, that shown in FIG. 1 and that shown in FIGS. 6 and 7, provide two different means for opening the power distribution circuit. One means is that normally used in household circuit breakers, namely, means for opening the circuit in response to overload currents, e.g., over 15 or 20 amperes. The other mode of opening is due to a ground fault in the manner described above. In the device shown in FIGS.

6 and 7, the current overload circuit breaker function can be performed by a conventional thermally-operated circuit breaker in the central circuit breaker panel.

Following is a table listing the components which were used in a circuit which was built and was successfully tested in accordance with the present invention.

| Component | Value or Identification |
|---|---|
| Transformer 30 | Two primary windings, one turn each 16 gauge or larger. One secondary winding, 500 turns 32 gauge wire. |
| Transformer 104 | One primary winding, 14 turns 32 gauge wire, one secondary winding, 14 turns 16 gauge wire. |
| SCR 82 | C106B (General Electric) |
| Transistor 66 | 2N2222 |
| Integrated Operational Differential Amplifier 54 | LM741 |
| Diode 64 | IN 914 |
| Diode 90 | IN 483 |
| Transistor 74 | 2N2222 |
| Zener Diode 78 | IN5342 |
| Zener Diode 86 | IN 759 |
| Diodes 94, 96, 98 and 100 | IN 4005 |
| Capacitor 88 | 6.8 Microfarads, 15 volts, 20% |
| Capacitor 80 | 2.2 Mirofarads |
| Capacitor 72 | 3.3 Microfarads |
| Capacitor 58 | 47 Microfarads, 6 volts, 20% |
| Capacitor 52 | 22 Microfarads, 6 volts, 20% |
| Resistor 116 | 36,000 ohms |
| Resistor 50 | 220 ohms |
| Resistor 56 | 47,000 ohms |
| Resistor 60 | 470,000 ohms |
| Resistor 62 | 10.000 ohms |
| Resistor 68 | 1000,000 ohms |
| Resistor 70 | 1,000 ohms |
| Resistor 76 | 10,000 ohms |
| Resistor 92 | 10.000 ohms |

The above description of the invention is intended to be illustrative and not limiting. Various changes or modifications in the embodiments described may occur to those skilled in the art and these can be made without departing from the spriit or scope of the invention.

I claim:

1. A ground fault-indicator device for indicating ground faults in an A.C. power line, said device including detecting means for detecting and indicating a pre-determined difference between the currents flowing towards and away from a load on said line, said detecting means including control means for substantially eliminating quadrature signals from said difference, said control means comprising means for enabling said detecting means only during alternate half-cycles of the A.C. line voltage, and means for averaging the output signals of said detecting means.

2. A ground fault-indicator device for indicating ground faults in an A.C. power line, said device including detecting means for detecting and indicating a pre-determined difference between the currents flowing towards and away from a load on said line, said power line having at least two conductors, a transformer with two oppositely-wound primary windings on a core, each primary winding being connected in series with one of said conductors, and a secondary winding on said core, at least one of said conductors being grounded adjacent the A.C. source, a current transformer having a primary winding and a secondary winding, said secondary winding being connected in series with one of said conductors so as to change the balance of the first-named transformer when said one conductor is grounded at a location between the first-named transformer and a load, said detecting means being adapted to detect said change in balance, a current-limiting impedance connected in series with the primary winding of said current transformer, and means for connecting the combination of said impedance and the latter primary winding between said conductors.

3. A device as in claim 2 in which said impedance and primary winding combination are connected to said conductors at locations between said first-named transformer and said A.C. source.

4. A ground fault-sensitive circuit breaker device for opening an A.C. line having at least two conductors, said device including circuit breaker contacts in one of said conductors, electromagnet means for disconnecting said contacts from one another, a balanceable transformer having a core, first and second primary windings wound oppositely on said core, each such primary winding being connected in series with one of said conductors, a secondary winding on said core, means for detecting a pre-determined balance condition in said core, said balance condition being the result of a ground fault on one of said conductors, said detecting means including a high-gain differential operational amplifier for amplifying signals from said secondary winding and means for detecting a pre-determined output level from said amplifier and means for energizing said electromagnet means in response to detection of said level, gating means for gating "on" the output of said amplifier only during alternate half-cycles of line voltage, integrator means for integrating and smoothing the output from the gating means, means for turning on a semiconductor switch when the integrator output reaches zero, said switch providing a low impedance connection of said electromagnet means to said conductors to open said breaker contacts.

5. A device as in claim 4 including a current transformer with a secondary winding of relatively large gauge wire connected in series with said other conductor, and a primary winding of relatively small gauge wire, a current-limiting impedance connected to said primary winding, and means for supplying current through said impedance and primary winding.

6. A device as in claim 5 in which said impedance comprises a portion of said detecting means.

7. A device as in claim 5 in which said electromagent means is connected in series with said impedance and said primary winding, and, with no ground fault present, the current flowing through said primary winding is substantially greater than that which must be developed in the secondary winding of said current transformer in order to ensure operation of said detecting means when said other conductor is grounded adjacent a load connected to said line, whereby said current transformer can be relatively inefficient and inexpensive.

8. A device as in claim 4 including a gating transistor for conducting the output of said amplifier through its collector-emitter path during alternate half-cycles of line voltage, a Miller integrator circuit connected to receive signals from said gating transistor, said integrator including an emitter-base diode, a temperature-compensating diode connected in a bridge circuit with said amplifier, gating transistor and integrator transistor in a sense such that temperature-induced resistance changes in aid compensating diode integrator transistor.

9. A device as in claim 4 including a resistor connected between the input said of the first primary winding and the output side of the second primary winding so as to form a bridge circuit with a grounding impedance when the first conductor is connected through a fault to ground.

10. A device as in claim 2 in which the value of said current-limiting impedance is such as to provide the primary winding of said current transformer with an energizing current of approximately twice the value of the ground fault current to be detected.

* * * * *